United States Patent [19]

Dodenhoff

[11] 4,159,110

[45] Jun. 26, 1979

[54] FOLDING WHEELED WALKER

[76] Inventor: William J. Dodenhoff, 2418 35th Ave., North, St. Petersburg, Fla. 33713

[21] Appl. No.: 871,365

[22] Filed: Jan. 23, 1978

[51] Int. Cl.² ........................ F16M 13/08; A61H 3/04

[52] U.S. Cl. ........................ 272/70.3; 297/5; 280/42; 135/67

[58] Field of Search ........... 135/67; 297/5, 6, DIG. 4; 272/70.3, 70.4; 280/42, 639, 651

[56] References Cited

U.S. PATENT DOCUMENTS

| | | | |
|---|---|---|---|
| 2,560,062 | 7/1951 | Ames | 280/42 |
| 2,732,004 | 1/1956 | Forbes | 272/70.4 |
| 2,862,544 | 12/1958 | Lilja | 272/70.3 |
| 3,945,389 | 3/1976 | Smith | 135/67 |
| 3,993,088 | 11/1976 | Thomas | 135/67 |

FOREIGN PATENT DOCUMENTS

| | | | |
|---|---|---|---|
| 2303151 | 10/1976 | France | 280/42 |
| 806651 | 12/1958 | United Kingdom | 272/70.4 |

*Primary Examiner*—Ernest R. Purser
*Assistant Examiner*—Conrad L. Berman
*Attorney, Agent, or Firm*—Walter J. Monacelli

[57] ABSTRACT

The walker disclosed herein comprises one equipped with wheels and is hinged at one or two front vertical supports so that it may be easily folded for carrying or for storage. In spite of its collapsible design, the walker is equipped with a locking device to prevent inadvertent folding, the locking device being one which is easily put into or removed from its locking position.

1 Claim, 8 Drawing Figures

FIG. 1
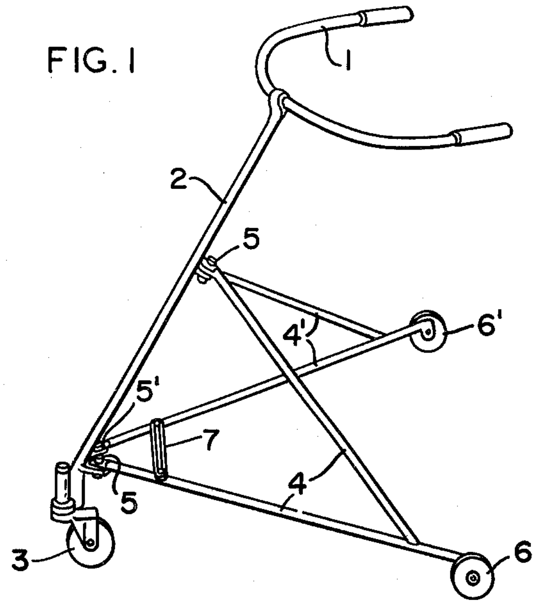
FIG. 5
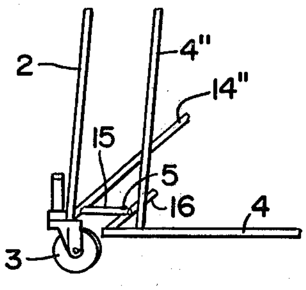
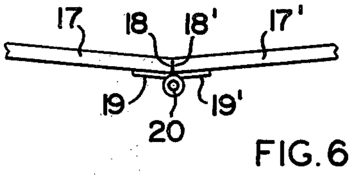
FIG. 6
FIG. 2
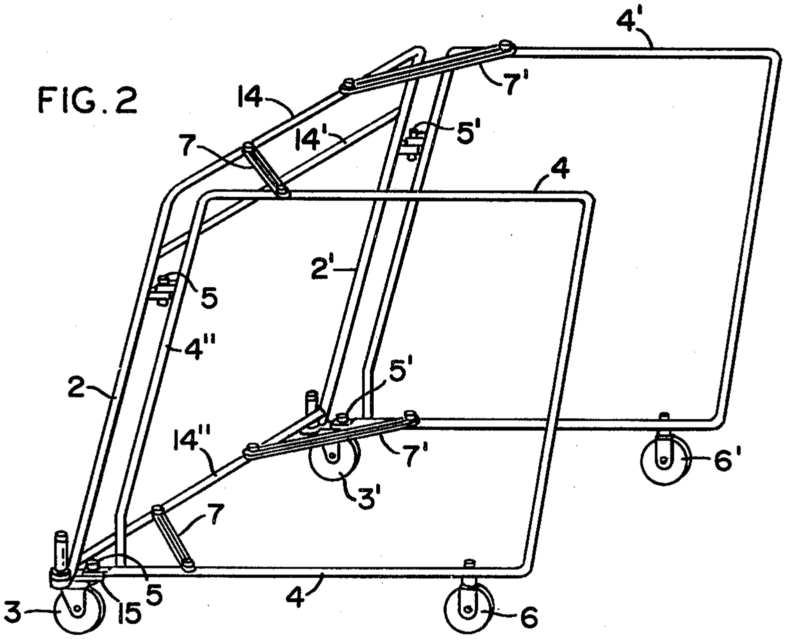
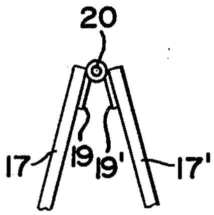
FIG. 7
FIG. 8
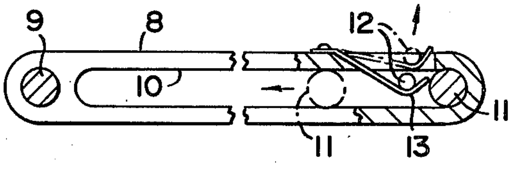
FIG. 3
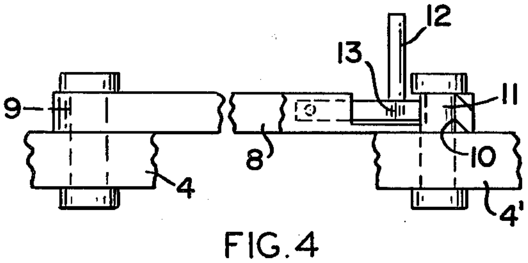
FIG. 4

FOLDING WHEELED WALKER

BACKGROUND OF THE INVENTION

1. Field of the Invention

This invention relates to a walker used by people who are unable to support themselves and cannot walk without the aid of such a device. More specifically, it relates to a walker equipped with wheels, thereby making it easier for movement of the walker. Still more specifically, it relates to a wheeled walker which is foldable for transporting and storage.

2. State of the Prior Art

The most common walking aid for the infirm incapable of supporting and propelling themselves are aluminum or other lightweight frame structures on which the user leans while taking a step and then lifts and moves the frame forward before taking the next step.

A number of similar wheeled structures have been suggested in various patents. However, for various reasons these have not become commercially acceptable, probably because of the complicated, and possibly expensive design. Moreover, none of these suggest a collapsible structure which will facilitate transportation and storage. Such patents include U.S. Pat. Nos. 906,845; 1,307,058; 1,394,224; 1,448,783; 2,792,052; 3,195,550 and 3,625,237.

SUMMARY OF THE INVENTION

In accordance with the present invention, it has been found that a simple, sturdy and safe walker is made according to the structure described herein which facilitates walking movement of an invalid with maximum support and ease of movement. In this design there is a top supporting bar or bars on which the user may lean or support himself. This may be an independent curved bar supported from a vertical supporting bar or two vertical supporting bars. From the one or two vertical supporting bars there are two side framework sections hingedly connected to the one of two vertical supporting bars and adapted to fold toward each other in the case of a single vertical supporting bar, or toward the front of the walker in the case of two vertical supporting bars. The walker has a swiveled wheel attached at the bottom of the single vertical supporting bar or at the bottom of each of the two vertical supporting bars, and also has a wheel attached to the lower extremity of each of the side framework supporting sections at a point farthest removed from the said vertical bar to which the framework section is attached. There is also provided a locking mechanism which locks the side sections from inadvertently folding. This mechanism is designed so as to be easily maneuvered by the patient so as to lock or unlock the side sections.

The walker of this invention is easily moved by the patient but is designed in such a sturdy manner that it is practically impossible to tip over the walker while a patient is positioned therein.

The description of the walker of this invention may be facilitated by reference to the drawings in which:

FIG. 1 is a perspective view of a modification of this invention having a single vertical supporting rod;

FIG. 2 is a perspective view of a modification of this invention having two vertical supporting bars;

FIG. 3 is a top view of a locking mechanism suitable for locking the side framework into fixed position;

FIG. 4 is a side elevational view of this same locking mechanism; and

FIG. 5 shows a perspective view of a lower section of a modification of FIG. 4.

FIGS. 6, 7 and 8 are views of an alternative locking mechanism.

In FIG. 1, the handle bar 1 is attached to the top of vertical supporting bar 2 which has swivel wheel 3 attached to its lower extremity. Side framework sections 4 and 4′ are hingedly connected by pins 5 and 5′. Wheels 6 and 6′ are attached at the lower extremities of side framework sections 4 and 4′, respectively. Locking device 7 holds the side framework sections firmly in supporting position when locked, and when released, allows the two framework sections to come toward each other so that the walker may be collapsed and flattened for transportation or storage.

In FIGS. 3 and 4, a particular type of locking device is shown in greater detail. Slotted bar 8 is fastened to one of said framework sections 4 or 4′ by pin 9. Slot 10 extends through a substantial portion of the length of bar 8 and allows the pin 11, when released by pressing handle 12, to compress the spring-actuated catch 13 and thereby allow pin 11 to pass along the slot toward pin 9. Pin 11 is attached to the other framework section 4 or 4′ and when the catch is released and the two framework sections moved toward each other, pin 11 moves along the slot as described above. Then, when it is desired to revert the walker for support of a patient, the framework sections are pushed away from each other so that pin 11 slides away from pin 9 and past the catch 13. When the pin 11 is pressed against the catch 13 in this motion, the spring in this catch is compressed to allow passage of the pin, and after the pin 11 passes the catch, the spring presses the catch 13 back into position so as to lock pin 11 into position at the end of slot 10, thereby keeping the two framework sections from moving toward each other.

FIG. 2 shows a modification having two vertical supporting bars 2 and 2′ joined together by two or more horizontal bars 14, 14′ and 14″. The lower extremities of vertical supporting bars 2 and 2′ have swiveled wheels attached thereto. Side framework sections 4 and 4′ are hingedly attached to the vertical supporting bars 2 and 2′ respectively, by pins 5 and 5′. At the lower extremities of these side framework sections, wheels 6 and 6′ are attached at points farthest removed from the vertical supporting bars. The upper horizontal bars of the side framework sections serve as supports instead of the handle bar in FIG. 1, on which the patient may lean or support himself while using the walker. Locking mechanisms 7 and 7′ are similar to those shown for FIG. 1. However, other designs of locking mechanisms may be used for this purpose provided they are types that will not inadvertently or prematurely unlock while the walker is being used. The side framework sections have a length less than the distance between the two vertical supporting bars so that they may be folded inwardly without striking each other.

FIG. 5 shows a perspective view of a modified hinged lower section of FIG. 4 which is adapted to compensate for having either or both the front and side sections tilted or slanted inwardly from bottom to top of the sections. Horizontal extension 15 connecting to horizontal bar 14″ and horizontal extension 16 connecting to horizontal side framework 4 are longer than the corresponding portions of the upper hinged sections. The openings in these horizontal extensions for receiving pin 5, which gives hinged action, are spaced an appropriate distance from the horizontal bar 14″ and the side framework section 4 so that pin 5 is in vertical alignment with pin 5' in the upper hinged section. This facilitates movement of the side section on its hinges.

FIG. 6 is a side elevational view of an alternative locking mechanism. Bars 17 and 17' have abutting edges 18 and 18' at an angle so that when pressed against each other, they are in the locked position shown in FIG. 6. The bars are joined by welding to hinge flanges 19 and 19' which are capable of rotating about hinge pin 20. Only when foot pressure or other pressure is applied upward against this hinged device will the mechanism be unlocked to take the unlocked position shown in FIG. 7. FIG. 8 shows a top view of this same locking mechanism. This locking mechanism may be used in place of that shown as 7 in FIGS. 3 and 4 and are joined to the lower supporting bar 4' in FIG. 1, or to the lower supporting bars 4 and 14" in FIG. 2.

While reference is made to "vertical supporting bars", these bars are actually slanted inwardly toward the inside of the walker so as to avoid any possibility that the walker may be tipped over. Likewise, the side framework sections are slanted inwardly so as to avoid any possibility of tipping. This slanted type of structure makes the walker much safer to use and practically impossible to tip over.

This tilting of the side sections, of the front section, or of all three sections, guards against any tilting of the walker in the event the patient should rest his weight only on one of such sections and thereby pushes against the section. Without such tilting of the section, it might be possible to turn over the walker and permit the patient to fall unsupported.

The walker is constructed of any suitable material that is capable of supporting the weight of the patient. Advantageously, it is also lightweight, such as aluminum, that will be easier to lift and carry.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

The invention claimed is:

1. A walker for use by invalids comprising: (a) a top handle bar having front and side portions on which an invalid rests his hands or arms for support: (b) a single vertical bar, (c) side sections attached to said vertical bar adapted to fold inwardly toward each other, each of said side framework supporting sections being tilted inwardly from bottom to top thereof, and said top handle bar being independent of said side framework supporting sections; (d) a swiveled wheel attached to the lower extremity of said vertical bar and a wheel attached to the lower extremity of each of said side framework supporting sections at a point farthest removed from said vertical bar; and (e) a locking mechanism which prevents inward movement of said side framework sections while said walker is in use; said vertical bar being tilted inwardly from the bottom to the top extremities thereof to a degree that said handle bar is located in a position such that the patient using said walker will not have his feet strike either said vertical bar or said side framework supporting sections.

* * * * *